United States Patent
Powers et al.

(10) Patent No.: US 7,532,958 B2
(45) Date of Patent: May 12, 2009

(54) METHOD FOR REAL-TIME ASSESSMENT OF DRIVER WORKLOAD BY A NAVIGATION OR TELEMATICS DEVICE

(75) Inventors: Robert B. Powers, Ortonville, MI (US); Charles A. Massoll, Milford, MI (US); David E Bojanowski, Clarkston, MI (US); Richard A. Young, Troy, MI (US); Bijaya Aryal, Macomb Township, MI (US); Linda S. Angell, Grosse Pointe Farms, MI (US)

(73) Assignee: General Motors Corporation, Detroit, MI (US)

( * ) Notice: Subject to any disclaimer, the term of this patent is extended or adjusted under 35 U.S.C. 154(b) by 523 days.

(21) Appl. No.: 11/166,748

(22) Filed: Jun. 24, 2005

(65) Prior Publication Data

US 2006/0293799 A1    Dec. 28, 2006

(51) Int. Cl.
*G06F 17/00* (2006.01)
(52) U.S. Cl. .......................................................... 701/1
(58) Field of Classification Search ...................... 701/1, 701/36; 702/176, 179, 182, 187
See application file for complete search history.

(56) References Cited

U.S. PATENT DOCUMENTS 6,974,414 B2 * 12/2005 Victor ........................ 600/300
7,292,152 B2 * 11/2007 Torkkola et al. ............ 340/576

FOREIGN PATENT DOCUMENTS

| CN | 1627915 A | 2/2003 |
| WO | 0230700 A2 | 4/2002 |
| WO | 0230700 A3 | 4/2002 |
| WO | 0233529 A2 | 4/2002 |
| WO | 0234571 A2 | 5/2002 |
| WO | 0234571 A3 | 5/2002 |
| WO | 2005/050522 A1 | 6/2005 |

OTHER PUBLICATIONS

Hankey, Jonathan M. et al, "Development of a Design Evaluation Tool and Model of Attention Demand"; Virginia Tech Transportation Institute, Science Applications International Corporation and Federal Highway Administration Study, 2000, pp. i-18.

* cited by examiner

*Primary Examiner*—Yonel Beaulieu

(57) ABSTRACT

An apparatus and method are disclosed for real-time assessment of driver workload by a vehicle device. To determine driver workload, the system monitors the driver interaction with the vehicle device. The driver interaction is then used to determine an estimated driver workload based on the driver interaction. In one embodiment, the vehicle device has one or more buttons configured to be pressed by the driver and each of the one or more buttons has an assigned driver workload value. The system sums the workload value of the buttons pressed by the driver over a moving time window to determine the estimated driver workload.

17 Claims, 3 Drawing Sheets

METHOD FOR REAL-TIME ASSESSMENT OF DRIVER WORKLOAD BY A NAVIGATION OR TELEMATICS DEVICE

TECHNICAL FIELD

The present invention generally relates to driver interaction with a vehicle navigation or telematics device, and more particularly, the present invention relates to real-time assessment of driver workload by a navigation or telematics device.

BACKGROUND

Automobiles contain many instruments and gauges that provide useful information to the driver. Traditionally, the most critical information displays are positioned in front of the driver so that with just a glance, the driver can view them. These displays included a speedometer, gas gauge, temperature gauge and/or any warning lights. Other "secondary" displays, such as radios and clocks, were positioned off to the side of the drivers view toward the center of the car. This position allows both the driver and passengers in the car to view the displays. The radio usually provided just a basic display to indicate which station was on, and push buttons or knobs that the driver or passengers could use to change the station.

As the electronics in automobiles become more sophisticated, these secondary devices become more complex and have many features and functions that the driver can interact with and display much information. While a quick interaction with the device may be safe, continuous use or overuse of these devices may not be, drawing the attention of the driver away from the road. One alternative is to completely lock out features or functions on devices that are excessively demanding, or could be excessively demanding if overused. While this may be a safe alternative, it penalizes the ordinary driver who does not overuse the device. The other alternative is for not locking out any features or functions on devices, which may increase risk but does not penalize the driver. The concern with this is that the drivers are overloaded with information, sometimes called "driver workload".

There are prior art patents and publications that are designed to interpret information about the vehicle or vehicle environment to manage driver workload. One publication describes a mathematical model for predicting driver workload titled "The Development of a Design Evaluation Tool and Model of Attention Demand." (the DEMAND Model, incorporated in its entirety by this reference). The user inputs information about the system and tasks into the DEMAND Model computer program, and based on prior experiments done with drivers, estimates such characteristics as the number of glances that would occur during a given task in the vehicle. The DEMAND program was designed to be run in an off-line manner and estimate driver workload for different tasks done in an automobile. See also "SYSTEM AND METHOD FOR DRIVER PERFORMANCE IMPROVEMENT" (WO 20/33529A2), "METHOD AND APPARATUS FOR VEHICLE OPERATOR PERFORMANCE ASSESSMENT AND IMPROVEMENT", (WO 20/34571A2,A3), and "METHOD AND APPARATUS FOR IMPROVING VEHICLE OPERATOR PERFORMANCE" (WO 20/30700A2,A3), all incorporated by reference.

The prior art patents and publications disclose extensive communications need to occur over a system bus, for example, to allow a system to deduce the workload state in the vehicle. The prior art does not take into account the details of the driver's direct control input into the navigation or telematics device in calculating workload.

Accordingly, it is desirable to provide a method and system for real-time assessment of driver workload by a navigation or telematics device. It is further desirable to lockout some features and functions of the navigation or telematics device if the driver workload becomes excessive. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for real-time assessment system of driver workload by a vehicle device. To determine driver workload, the system monitors the driver interaction with the vehicle device. The driver interaction is then used to determine an estimated driver workload based on the driver interaction. In one embodiment, the vehicle device has one or more buttons configured to be pressed by the driver and each of the buttons has an assigned driver workload value. The system sums the workload value of the buttons pressed by the driver over a moving time window to determine the estimated driver workload.

A method is provided for real-time assessment of driver workload based on driver interaction with a vehicle device. The method comprises monitoring driver interaction with one or more buttons on the vehicle device that are configured to be pressed by the driver. Each of the buttons has an assigned driver workload value. The method further includes estimating the driver workload with the vehicle device by summing the driver workload values of the individual buttons pressed over a moving time window.

A vehicle device is provided that is capable of real-time assessment of driver workload based on driver interaction. The vehicle device comprises one or more buttons configured to be pressed by the driver. Each of the buttons is assigned driver workload value. The vehicle device further comprises one or more processors coupled to the buttons. The processors are used to estimate the driver workload by summing the driver workload values of the individual buttons pressed over a moving time window.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The present invention will be described with examples in relation to particular vehicle systems and devices, but it is not intended that the invention be limited to any particular design or system. For the sake of brevity, conventional techniques related to vehicle electronics, processing, data transmission, and other functional aspects of vehicle systems (and the individual operating components of the vehicle systems) may not be described in detail herein. The vehicle system may employ a microcomputer or microprocessor for timing and controlling device functions in accordance with an operating system. The operating system may include memory for storing a variety of programmed-in operating modes and parameter values that are used by the operating system. The memory registers may also be used for storing data compiled from device activity and/or relating to device operating history.

The present invention provides a system and method for real-time assessment of driver workload (DW) when using a navigation or telematics device. The present invention uses a self-contained DW estimator that can estimate the DW in real-time in the device itself. It takes into account the workload demands on the driver by the driver's interaction with the device using well-established mathematical methods for estimating DW as a function of the buttons pressed and their locations on the faceplate or touch screen. The present invention does not require any external information to be received over a system bus or from other parts of the vehicle to perform the DW assessment. While such external information is not excluded from being used should it be considered useful in determining DW, it is not needed for present invention.

Figure 1:
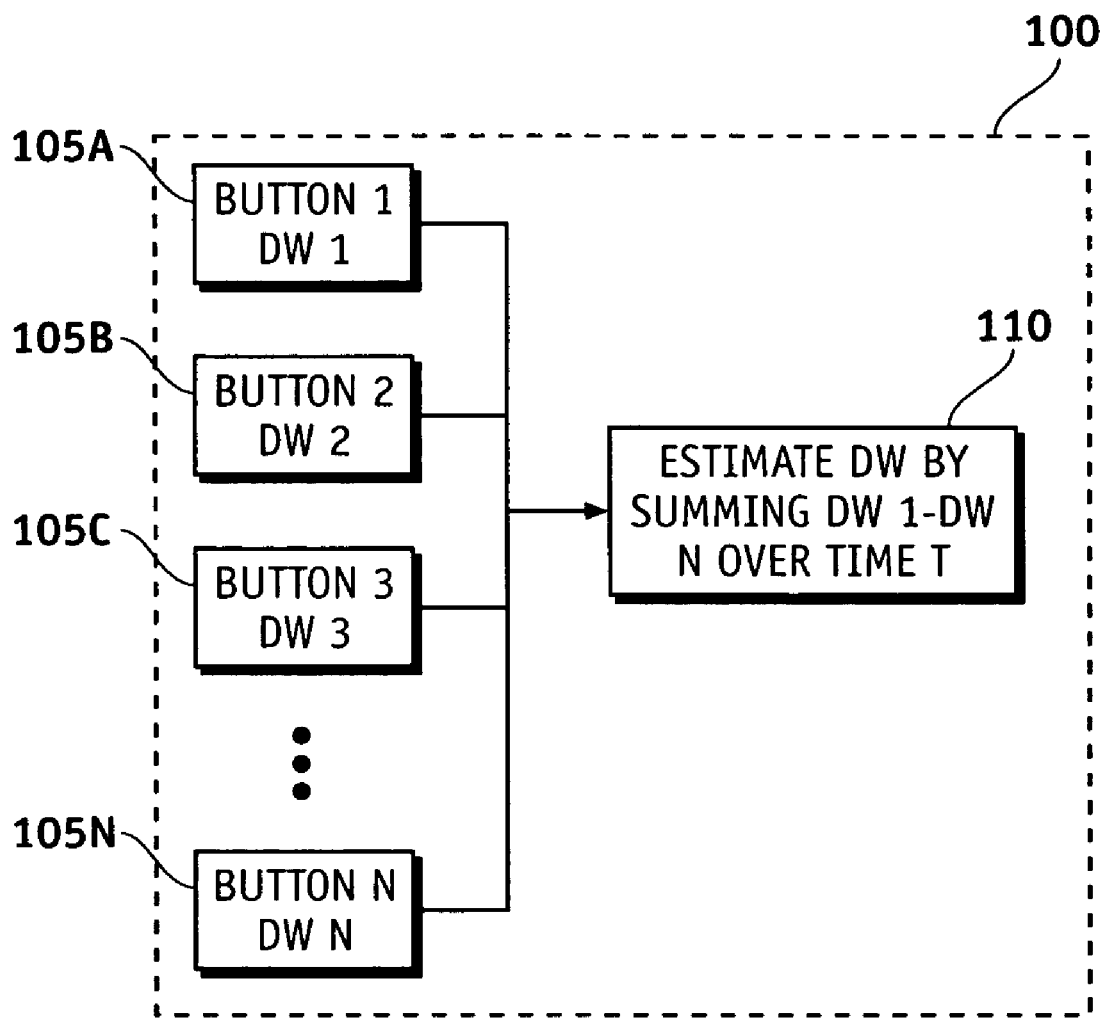
FIG. 1 is a block diagram showing processing for a driver workload assessment system.

FIG. 1 is a block diagram showing processing for a driver workload assessment system in a navigation or telematics device 100. Driver interactions through input buttons 105a-105n are monitored and input to a driver workload (DW) estimator 110. Each of the buttons 105a-105n have assigned DWs (DW 1-DW N), depending on their functions. The DW estimator 110 includes application code for creating a overall DW by summing the DW for the buttons pushed by the driver. The DW estimate 110 is based on a short-term time frame t, which may be between 0 and 16 seconds. In an exemplary embodiment, the DW estimator 110 uses a microprocessor contained within the navigation or telematics device. The microprocessor may be used to monitor the driver interactions through input buttons 105a-105n, store the DW values for each of the input buttons and to sum the DW values of the individual buttons that were pressed to obtain the estimated DW.

The specific inputs to the DW estimator 110 depend on which button or combination of buttons 105a-105n are selected or pressed. As depicted in FIG. 1, the example embodiment of the present invention calls for attaching to each and every button in the navigation or telematics device a DW value (DW 1-DW N). The DW value for each button is weighted and may be based on experimental data, or data from a workload prediction model, such as the DEMAND model (discussed in the BACKGROUND). It is known from experimental psychology that the reaction time in a choice situation increases as a function of the number of buttons that can be chosen from. In the present invention, a button or menu item that constitutes a choice of one out of five buttons (or menu items), would have a higher DW value assigned to it than a choice of one out of two buttons. The point is that all the button layouts are a priori described in the software and hardware design of the system, and so can easily be assigned a DW value. The benefit of the present invention is the realization that this math modeling can all be done in real-time directly in the navigation or telematics device itself. In that way, the real-time DW can be evaluated and calculated.

The sophistication of navigation or telematics devices has evolved over the past few years, with many of the devices having one or more internal microprocessors or computers. A microprocessor may be dedicated to performing DW estimator 110 functions or, alternatively, the microprocessor may include application code for performing other functions in the navigation or telematics device along with the DW estimator 110 functions. As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, DVD, flash drives, or any other computer-readable storage medium, wherein, the computer program code is loaded into the navigation or telematics device and executed by the internal microprocessor. An embodiment of the present invention can also be embodied in the form of computer program code loaded into the navigation or telematics device by physical connections, such as electrical wiring or cabling, or wirelessly, such as RF or Bluetooth, wherein, the computer program code is loaded into the navigation or telematics device and executed by the internal microprocessor.

Figure 2:
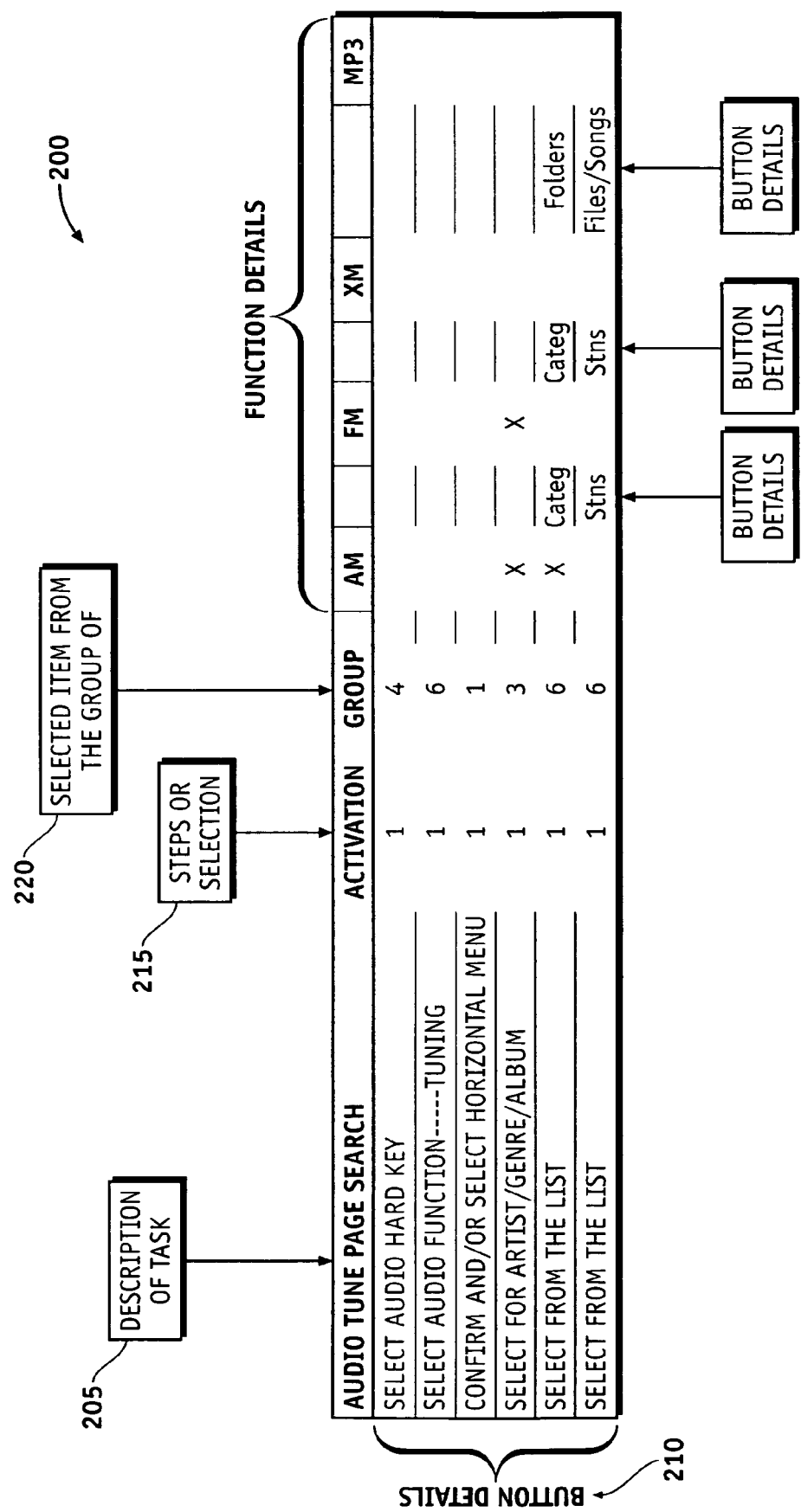
FIG. 2 shows one embodiment of a spreadsheet for use with a driver workload assessment system.

The calculations for DW may be done by known methods for any and every task in the system. FIG. 2 shows one embodiment of a spreadsheet 200 for use with the present invention. The spreadsheet 200 may include a description of the task 205, the buttons 210 that may be associated with the task 205, the steps or selection 215 of the buttons, and the group 220 associated with the buttons 210. The group 220 refers to the number of choices or menu items available to the driver. As pointed out above, as the number and/or complexity of button choices increases, the higher the DW value for that particular button. The DW value may be any number that increases as the DW increases. As each button is pressed, the DW value is recorded over time in the DW estimator.

Once the DW is assessed by the navigation or telematics device it may be used for other processes. For example, for excessive DW, some systems may completely lock out all features and functions that were excessively demanding. Other systems may do nothing and permit unfettered access to all features and functions in the vehicle system, regardless of potential customer eyes-off-road or excessive DW.

In one embodiment, the present invention offers a middle-of-the-road alternative that can adapt to the individual driver use patterns of navigation or telematics devices without having to permit all features and functions to be available to customers at all times, leading to potential safety issues. The present invention allows ordinary drivers access to features and functions they would use but monitors in real-time the driver usage patterns. It does not require "hard" lockouts, predetermined by the manufacturer that may not be appropriate for actual driver usage patterns and lead to driver dissatisfaction. The present invention will also minimize driver dissatisfaction with such lockouts, in a manner that will allow for improvements in driver performance compared to unfettered driver access to features and functions that might otherwise exceed driver performance criteria. As a result, the present invention will offer safety and security to the driver, as well as meeting driver needs and wants for higher information, communication, and navigation content in their vehicles. It is expected that the driver will rapidly learn what activity is leading to excessive DW demands, and will quickly learn how to improve their performances with the navigation or telematics devices to avoid the device lockouts.

Figure 3:
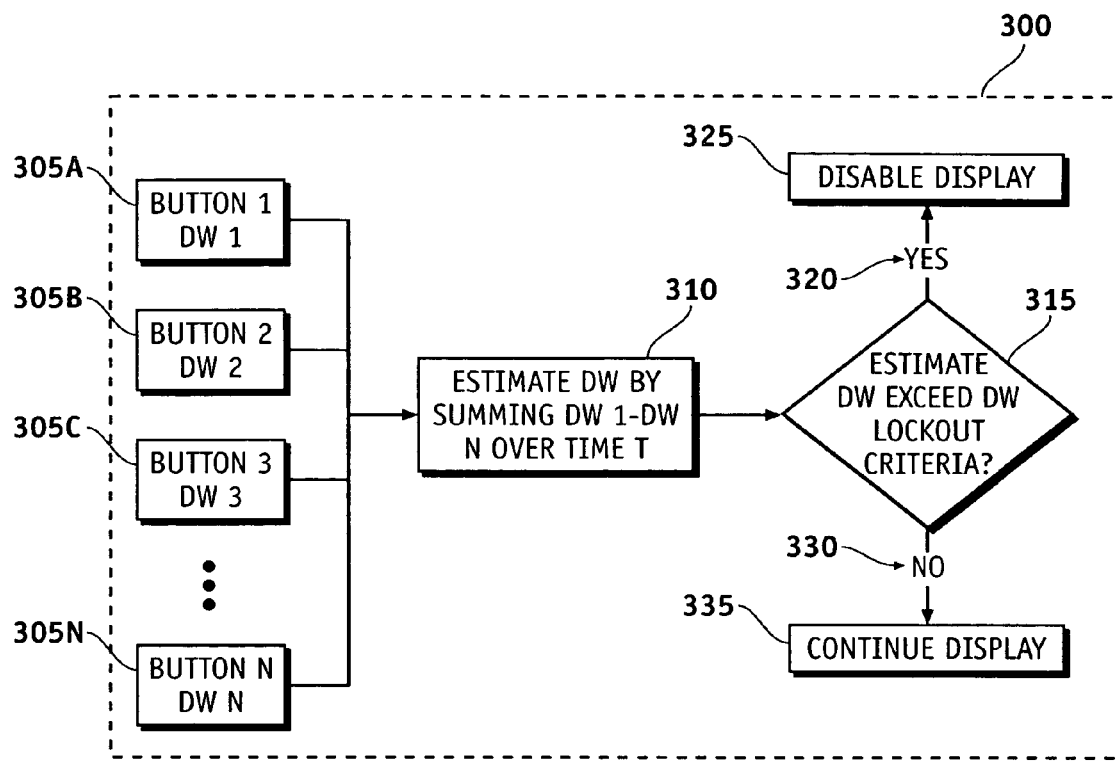
FIG. 3 is a block diagram showing an adaptive display lockout system using a driver workload assessment system.

FIG. 3 is a block diagram showing an adaptive display lockout system in a navigation or telematics device 300 that uses estimated driver workload (DW). Driver interactions through input buttons 305a-305n are monitored and input to a driver workload (DW) estimator 310. Each of the buttons 305a-305n have assigned DWs (DW 1-DW N), depending on their functions. The DW estimator 310 includes application code for creating a overall DW by summing the DW for the buttons pushed by the driver. The DW estimate 310 is based on a short-term time frame t, which may be between 0 and 16 seconds.

A microprocessor 315 may be used to compare the estimated DW with a DW lockout criteria. If the estimated DW meets/exceeds the DW lockout criteria 320, the display is disabled or locked out 325. If the estimated DW does not meet/exceed the DW lockout criteria 330, the display continues 335.

The disablement of the display may have "soft" or "adaptive" DW limits, thereby eliminating the need for "hard" lockouts of vehicle features and functions, which can be undesirable for the driver in some cases. For example, it is only if too many buttons with high DW values are pressed in too short a time that a DW lockout criteria would be reached. One embodiment of an adaptive lockout system is described in co-pending patent application titled METHOD FOR ADAPTING LOCKOUT OF NATIVATION AND AUDIO SYSTEM FUNCTIONS WHILE DRIVING, USPTO application Ser. No. 11/171,846, filed Jun. 30, 2005, incorporated by this reference, which discloses disabling a display on a vehicle device if the driver interaction is predicted to lead to excessive visual demand by the driver. The system is adaptive in the sense that it does not automatically lock out all functions and features while driving; it is only when the driver interaction with the device becomes excessive that the system will disable features of the device. For ordinary drivers, the adaptive lockout system allows access to features and functions they would normally use. For drivers who try things that may lead to excessive DQ, such as excessive visual demand as determined in real-time evaluation, there would be a "graceful degradation" of navigation or telematics services that encourages return of the eyes to the road.

Although there a certain individual drivers who do not "like" lockouts, the present invention will minimize dissatisfaction with such lockouts in a manner that will allow for improvements in driver performance compared to unfettered driver access to features and functions that might otherwise exceed driver performance criteria. It is expected that the driver will rapidly learn what activity is leading to excessive DW demands after the gentle reminders by the adaptive display lockout system, and will quickly learn how to improve their performance with the system to avoid lockouts. Thus, the adaptive display lockout system uses a rather ingenious idea of using driver dissatisfaction with display lockouts to train them to improve their interaction with the adaptive display lockout system. As a result, the adaptive display lockout system is able to offer safety and security to the driver, as well as meeting the driver needs and wants for higher information, communication and navigation content in their vehicles.

Figure 4:
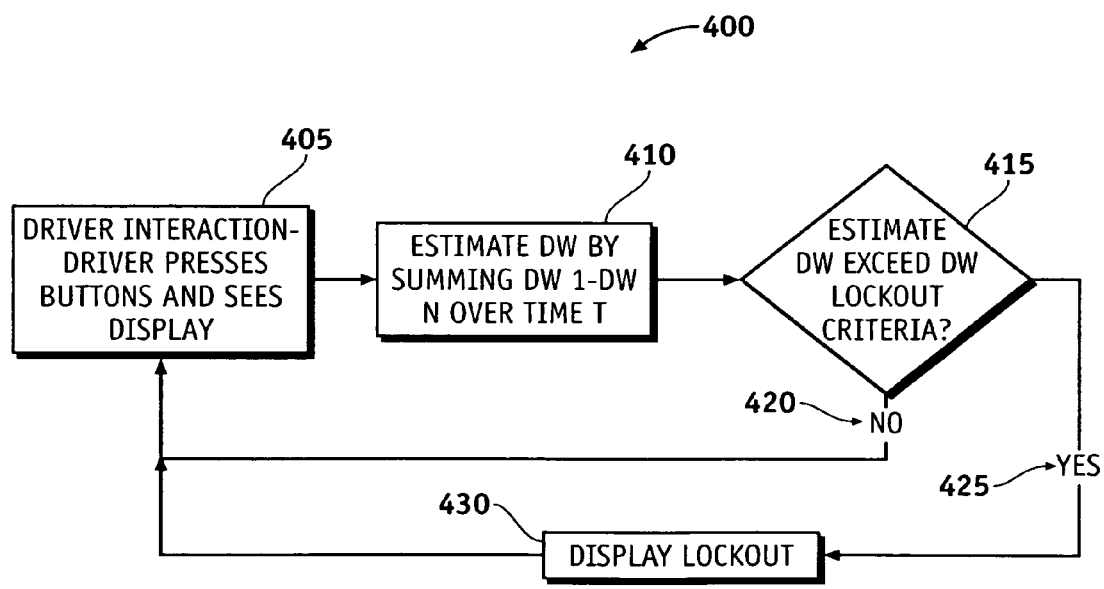
FIG. 4 shows a simplified flow chart of one embodiment of a process that may be performed by an adaptive lockout system using a driver workload assessment system.

FIG. 4 shows a simplified flow chart of one embodiment of a process 400 that may be performed by an adaptive lockout system that disables portions of a navigation or telematics device when a driver workload (DW) lockout criteria is met. The present invention will directly allow combinations of button presses on the navigation or telematics device to be evaluated and assessed in real-time, during actual driver usage of the device. At step 405, the driver interacts with the device by pressing one or more buttons on the navigation or telematics device. The buttons can either be "hard" or physical buttons, or buttons or menu items on a touch screen ("soft" buttons). Each of the button presses in the system is assigned a DW value. The DW value for each button is weighted, as discussed above. In one embodiment, the DW value may be assigned to each button in advance, such as embedded values in a look-up table or spreadsheet, based on experimental data or date from workload prediction models, such as the DEMAND model. In another embodiment, the DW value is calculated in real-time using equations or as the driver presses the buttons. As each button is pressed by the driver, a real-time summation of the workload values for each button is done inside the device over a moving time window (step 410). The moving time window may range from 0 to 16 seconds. If the real-time DW assessment does not exceed an established DW lockout criteria value (step 415), all screens and buttons are available, i.e., no lockouts (step 420). If the DW lockout criteria is exceeded (step 425), the display is disabled or locked out from responding to pressed buttons for a timed interval or display lockout time period (step 430). The display lockout time period may range from 0 to 16 seconds.

The usefulness and merit of the present invention is that the entire feature-function content and every task in the system can be given assurance that they can be safe for customer use. It is only with great difficulty that all possible tasks or combinations of button presses could even be specified in advance, much less tested except in mathematical analysis. It is impossible to be able to test with real human subjects every combination of button presses that could be done with the system. The advantage of the present invention is that all possible combinations of buttons will be covered within the production systems, no matter what they are. The drivers themselves will determine what the limits are, no matter what their particular sequence of button presses. This mechanism will provide an advantage over systems with forced hard lockouts that will be coming into play by vehicle manufacturers through the application of the Alliance of Automotive Manufacturers (AAM) requirements to all vehicles sold in North America in the next few years. With the present invention, the drivers themselves can determine the pace of interaction with the system—it is their own behavior which will guide whether the workload limits are reached or not. Therefore, some drivers may never reach the limits for any feature, function, or task in the system. This invention will provide a viable alternative for manufacturers in meeting external driver workload constraints such as AAM, or potentially government criteria at a later time.

The sophistication of navigation or telematics device has evolved over the past few years, with many of the devices having an internal microprocessor or computer. As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, DVD, flash drives, or any other computer-readable storage medium, wherein, the computer program code is loaded into the navigation or telematics device and executed by the internal microprocessor. An embodiment of the present invention can also be embodied in the form of computer program code loaded into the navigation or telematics device by physical connections, such as electrical wiring or cabling, or wirelessly, such as RF or Bluetooth, wherein, the computer program code is loaded into the navigation or telematics device and executed by the internal microprocessor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for real-time assessment of driver workload by a vehicle device, comprising:
    means for monitoring driver interaction with the vehicle device;
    means for estimating driver workload based on the driver interaction;
    means for comparing the estimated driver workload to a driver workload lockout criteria; and
    means for disabling a display on the vehicle device if the estimated driver workload meets or exceeds the driver workload lockout criteria.

2. The system of claim 1, wherein the vehicle device has one or more buttons configured to be pressed by the driver.

3. The system of claim 2, wherein the means for monitoring driver interaction with the vehicle device includes means for counting the presses of the one or more buttons.

4. The system of claim 2, wherein each of the one or more buttons has an assigned driver workload value.

5. The system of claim 4, wherein the driver workload value is a stored value.

6. The system of claim 4, wherein the driver workload value is a calculated value.

7. The system of claim 4, wherein the means for estimating driver workload calculates the summation of the workload value of the one or more buttons pressed by the driver over a moving time window.

8. The system of claim 7, wherein the moving time period ranges from 0 to 16 seconds.

9. The system of claim 2, wherein the buttons are "soft" buttons on a touch screen.

10. The system of claim 1, wherein the driver workload lockout criteria includes the number of allowed driver interactions with the vehicle device in a preset time period.

11. The system of claim 1, wherein the vehicle device further includes one or more microprocessors.

12. A method for real-time assessment of driver workload based on driver interaction with a vehicle device, comprising:
    monitoring driver interaction with one or more buttons on the vehicle device configured to be pressed by the driver, wherein each of the one or more buttons has an assigned driver workload value;
    estimating the driver workload with the vehicle device by summing the driver workload values of the one or more buttons pressed over a moving time window;
    comparing the estimated driver workload to a driver workload lockout criteria; and
    disabling a display on the vehicle device for a display lockout time period if the estimated driver workload meets or exceeds the driver workload lockout criteria.

13. The method of claim 12, wherein the driver workload lockout criteria includes a number of allowed driver interactions with a vehicle device in a preset time period.

14. The system of claim 12, wherein the vehicle device further includes one or more microprocessors.

15. A vehicle device capable of real-time assessment of driver workload based on driver interaction, comprising:
    one or more buttons configured to be pressed by the driver, each of the one or more buttons being assigned driver workload value; and
    one or more processors coupled to the buttons, the one or more processors being configured to estimate the driver workload with the vehicle device by summing the driver workload values of the one or more buttons pressed over a moving time window and to disable a display on the vehicle device for a display lockout time period if the if the estimated driver workload meets or exceeds a driver workload lockout criteria.

16. The device of claim 15, wherein the driver workload lockout criteria includes a number of allowed button presses in a preset time period.

17. The device of claim 15, wherein the display lockout time period ranges from 0 to 16 seconds.

* * * * *